Aug. 16, 1955   O. E. BARSTOW ET AL   2,715,705
MOTOR CONTROL SYSTEM FOR INDICATING
AND RECORDING ROTAMETER
Filed July 16, 1951   4 Sheets-Sheet 1

INVENTORS
Ormond E. Barstow
Lloyd Taylor Finlayson
William A. Bridge

BY Griswold & Burdick
ATTORNEYS

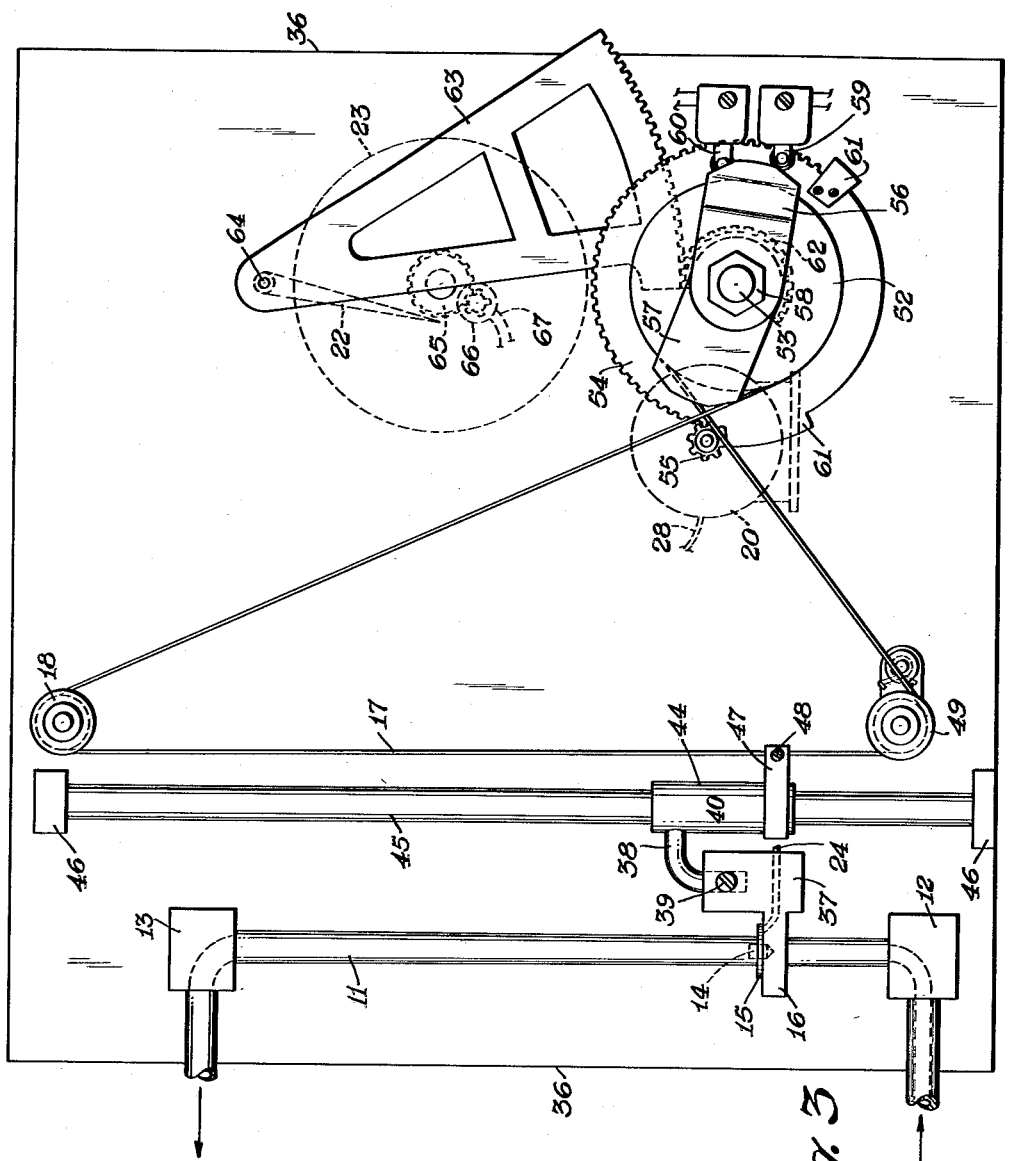

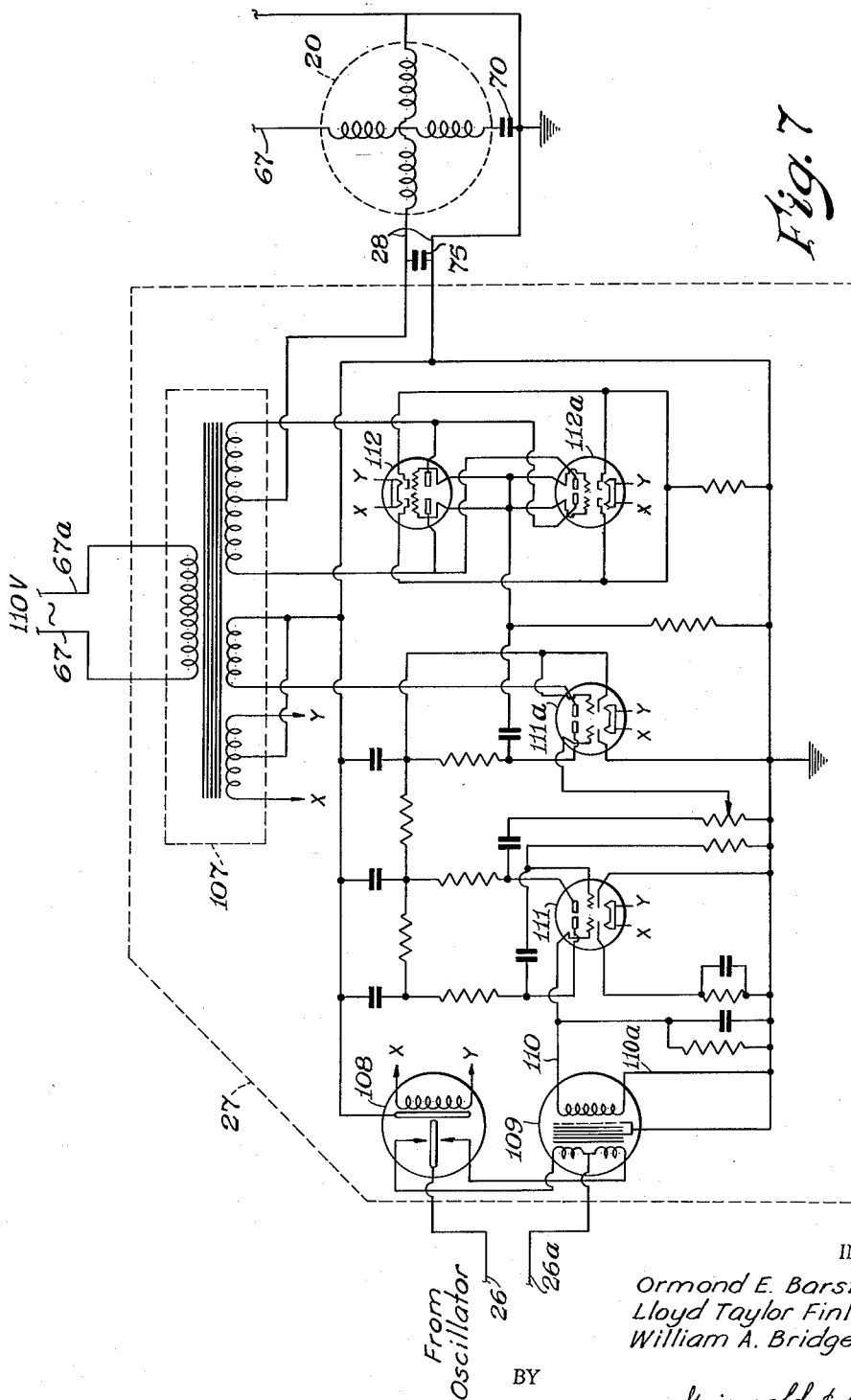

United States Patent Office

2,715,705
Patented Aug. 16, 1955

2,715,705

MOTOR CONTROL SYSTEM FOR INDICATING AND RECORDING ROTAMETER

Ormond E. Barstow, Lloyd Taylor Finlayson, and William A. Bridge, Midland, Mich., assignors to The Dow Chemical Company, Midland, Mich., a corporation of Delaware Application July 16, 1951, Serial No. 237,047

4 Claims. (Cl. 318—31)

This invention relates to an improved electrically operated instrument for use with a rotameter to indicate, record, or control the rate of flow of fluid through the metering tube.

The conventional rotameter, or variable-area flowmeter using a vertical tapered-bore glass tube with close-fitting float, is strictly an indicating instrument without recording or control functions. Further, the indications can be seen only at close hand, and then only if the fluid being metered is clear enough not to obscure the float.

Rotameters are available to which recording and control functions have been added by attaching to the float an indicating rod long enough to project into a separate chamber above or below the metering tube. In this chamber, an electric or magnetic device senses changes in the position of the rod and transmits them to a recorder-controller. While instruments of this type are effective in large sizes, difficulty is encountered in the case of small-bore rotameter tubes. With these latter, the rod attached to the float is either undesirably heavy or else so small as to be fragile and subject to sticking. In addition, in all sizes, the auxiliary chamber may trap dirt, or in metering polymerizable fluids, become fouled with gummy material, unless further complications by way of purging conduits or elaborate packing are added.

It is therefore the principal object of this invention to provide an improved indicating and recording device for use with rotameters which is satisfactory in all size ranges, and is effective even with low flows of polymerizable fluids. A related object is to provide a device in which the means for sensing the position of the float is entirely outside the rotameter tube, eliminating the need for a rod or other mechanical coupling attached to the float and also eliminating the auxiliary chamber. A further object is to provide a device allowing the recording and controlling elements to be mounted at a point remote from the rotameter tube.

These objects are realized in the instrument of the invention, now to be explained in detail with reference to the accompanying drawings, in which Fig. 1 is a simplified diagram illustrating schematically the operating principle of the new instrument in a preferred form;

Fig. 3 is an elevation of the mechanical elements of an actual instrument embodying the invention;

Fig. 4 is a perspective view showing the relation of the detector coil and the rotameter tube in the instrument of Fig. 3;

Fig. 7 is a circuit diagram of the amplifier indicated generally in Fig. 5.

Figure 1:
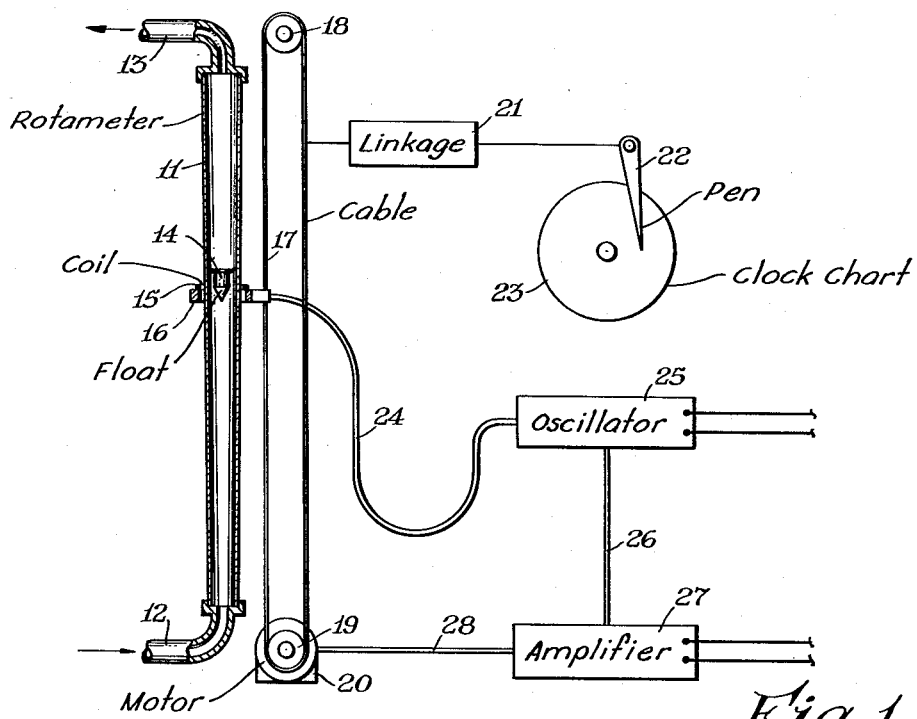

In the diagram of Fig. 1, a conventional glass tapered-bore rotameter tube 11 is shown mounted between hollow inlet and outlet fittings 12 and 13 forming part of a piping system for the fluid being metered. Within the tube 11 is the usual float 14 which assumes a vertical position in accordance with the rate of fluid flow through the tube. The details of the tube and float form no part of the invention, but the float should be constructed of a good electrical conducting material such as a metal, or at least a substantial part of the float should be made of such conducting material.

Encircling the tube 11 is a detector coil 15, which is mounted in a vertically movable holder 16 secured to one arm of a loop of wire cable 17. At a level above the top of the tube 11 the cable 17 passes over a supporting idler pulley 18, while below the bottom of the tube it runs over a similar pulley 19 mounted on the shaft of a reversible motor 20. A mechanical linkage 21 transmits motion of the cable 17 to a pen 22 which records on a clock-driven chart 23.

The coil 15 is connected electrically by an insulated cable 24 to form part of the tuning circuit of an electron-tube oscillator 25. The output of the latter is carried through a cable 26 as input to an electron-tube power amplifier 27, the output of which passes through a cable 28 to drive the motor 20.

In operation, the proximity of the float 14 to the coil 15 affects the tuning of the oscillator 25. The oscillator circuit and its auxiliaries are designed so that the output applied to the amplifier 27 is large when the coil 15 is remote from the float 14 but is zero when the coil is close to and encircling the float. Hence, with the coil balanced on the float, the amplifier 27 receives no input and does not actuate the motor. On the other hand, if the float moves so that the coil is displaced from balance position, the amplifier receives input and provides an output to the motor 20. This output is made of such polarity that the motor moves the cable 17 and hence the coil holder 16 in the right direction to return the coil to balance on the float. Consequently, when the instrument is operating, the coil 15 follows the float 14 through whatever changes in elevation it undergoes as a result of variations in the rate of flow of fluid through the tube 11. These changes in position of the coil are transmitted by the cable 17 and linkage 21 to the pen 22, and by it recorded on the chart 23. This latter is calibrated in terms of the flow rates corresponding to the positions of the float 14. Accordingly, the instrument provides a continuous record of the flow through the rotameter tube.

Figure 2:
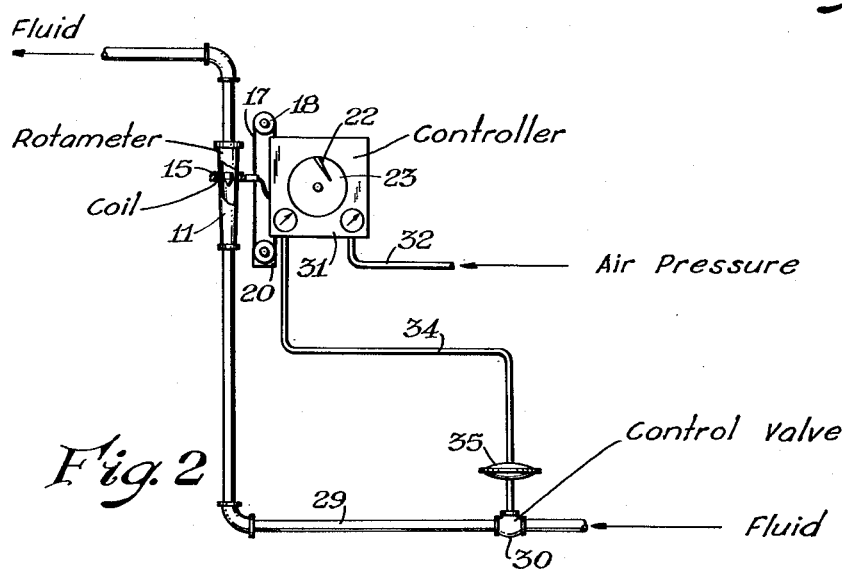
Fig. 2 is another simplified diagram, showing one way of using the instrument as a flow controller.

The use of the new instrument as a controller as well as recorder is illustrated diagrammatically in Fig. 2. In the arrangement shown, the instrument is employed to regulate the flow of fluid through a pipeline 29, in which are a control valve 30 and the rotameter tube 11. The pen 22 and chart 23 of the instrument have been built into a pneumatic controller 31, the pen being positioned by movement of the coil 15 as already explained. The controller 31, indicated only generally, is a standard instrument which receives steady air pressure from a source 32 and transmits to the line 34 a controlled air pressure which varies in accordance with the position of the pen 22. The line 34 leads to a diaphragm-actuator 35 controlling the valve 30. In operation, then, a variation of flow in the line 29 causes movement of the rotameter float. This movement affects the position of the pen 22, in turn producing a change in air pressure in the line 34, and correspondingly opening or closing the valve 30 in a direction to restore the initial flow in the pipeline.

In Fig. 3 the mechanical elements of a preferred instrument embodying the invention are shown mounted on an instrument panel 36. The rotameter tube 11, with its float 14, is held between hollow inlet and outlet fittings 12 and 13 of conventional design. The fittings, which are secured to the panel 36 by screws not shown, are large enough to provide substantial clearance between the tube and the face of the panel.

The detector coil 15 encircling the tube 11 is in the form of a short cylinder made of a number of turns of fine insulated wire (usually 25 to 70 turns depending on the diameter of the rotameter tube), with internal coil diameter slightly larger than the tube 11 (Fig. 4). The coil is inset in a recess in a holder plate 16 of insulating resin and is coated with a sealing cement to hold it in place. The coil and holder may, with advantage, be partially covered with thin metal sheet, not shown, to shield against stray magnetic and electrical effects.

Integral with the holder plate 16 is an adapter block 37, also of insulating resin, provided with a vertical central hole into which projects a support arm 38. This latter, which is held in the block by a set-screw 39, is secured at its other end to a carriage 40 for raising and lowering the coil assembly. A horizontal hole is also bored in the block 37 to receive the two-wire cable 24 by which the coil 15 is in circuit with the oscillator 25. The wires of the cable 24 are connected to the leads 41 of the coil 15 by soldered joints and the cable is anchored in the block 37 by screw 43 bearing against the soft metal sleeve 42 slipped over the end of the cable 24.

The carriage 40 consists essentially of a sleeve 44 which fits slidably over a vertical guide post 45 held spaced outwardly from the panel 36 by mounts 46. A slotted arm 47 welded to the sleeve 44 projects around the cable 17, being held firmly to the latter by a clamp-screw 48.

By virtue of the construction shown, the coil 15, plate 16, and adapter block 37 may be made in a number of sizes to accommodate rotameter tubes of different ranges without having to alter any of the remainder of the instrument. However, the carriage and coil holder may, if desired, be made in one piece.

The cable 17 is threaded over an upper pulley 18 and a lower spring-loaded pulley 49 in the same vertical plane, and finally is looped over a cable drum 52. This latter is pivoted on a horizontal axle 53 which is free to rotate on bearings (not shown) borne by the panel 36. All of the pulleys and the drum lie in planes parallel to the panel 36 and are supported on the latter by extensions of their respective axles.

The cable drum 52 is integral with a large gear wheel 54 also on the axle 53. This wheel is engaged by a pinion 55 on the end of the drive shaft of the amplifier-driven motor 20. As shown by dotted lines in Fig. 3, the motor 20 is behind the panel 36 with only its drive shaft projecting through. This motor is of the geared-head reversible split-field type, designed to withstand stalling. The pinion 55 and the cable drum 52 should be of such sizes that, at full motor speed, the coil 15 will traverse the entire length of the rotameter tube 11 in no more than four to five seconds.

Rotation of the drum 52 is limited by the action of two separate cams 56 and 57 which are both pivoted on the drum axle 53 so as to rotate with the gear wheel 54. Each cam is angularly adjustable, being locked in proper position by a knurled nut 58 threaded on the axle 53. The cam 56 is set to open a normally-closed roller-switch 59 when the drum reaches a position corresponding to the lower limit of travel of the carriage 40. The cam 57 is set to close a normally-open roller-switch 60 when the carriage 40 is at its upper limit of travel. (The operation of these cams and switches will be later explained with reference to the circuits of Fig. 5.) In addition, two safety stops 61 are fixed to the gear wheel 54 at angular positions also corresponding to the upper and lower limits of carriage travel to prevent overrunning in case a cam becomes displaced or a switch circuit fails. These stops strike the pinion 55 and thus stall the motor 20.

The linkage connecting the cable mechanism to the recording assembly includes a small gear 62 on the axle 53 behind the cable drum 52 and pinned to it so as to rotate with it. This gear 62 meshes with a large skeleton sector gear 63 mounted on a pivot 64 fixed in the panel 36. Behind the panel, the recording pen 22, also turning about the pivot 64, is fixed to an axial extension of the sector gear so as to move with the latter. This pen records on a round chart 23 which is turned by a gear 65 meshing with a gear-reduced synchronous clock motor 66.

Figure 5:
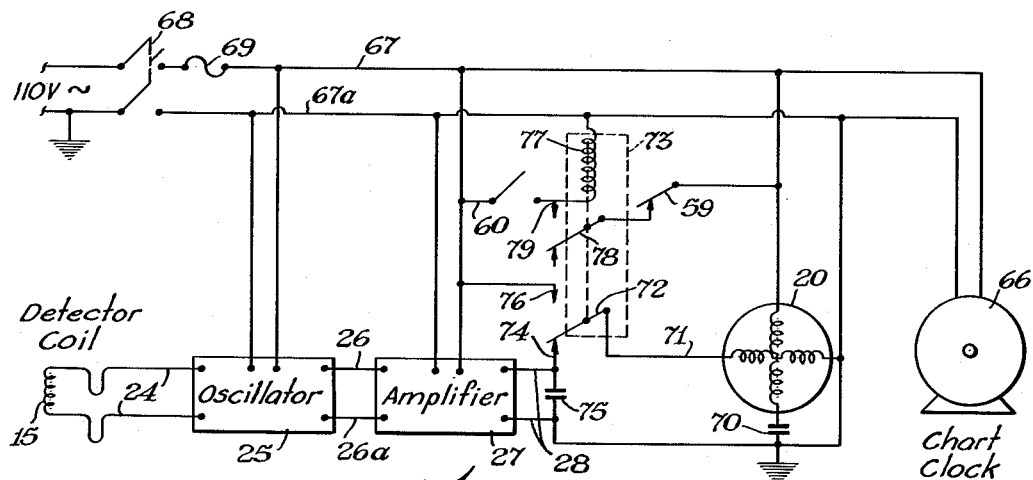
Fig. 5 is a schematic diagram of the electrical circuits used in the instrument of Fig. 3.

The electrical circuits of the instrument of Figs. 3 and 4 are given in Fig. 5. As there shown, power is derived from a pair of 110-volt 60-cycle alternating current leads 67 and 67A supplied through a master switch 68 and fuse 69. The oscillator 25, amplifier 27, and clock motor 66 are all connected directly across the lines 67 and 67A. One of the two split fields of the positioning motor 20 is also connected across the supply line 67, the usual motor capacitor 70 being inserted in series, with its line side grounded. The other field of the motor 20 is energized through a line 71 which receives current through one blade 72 of a double-pole double-throw relay 73 by which the motor may be connected to either of two power sources. In the normal or unenergized position of the relay, with the blade 72 on the contact 74, the line 71 is supplied directly by the output 28 of the amplifier 27. A capacitor 75 is across the output. When the relay is energized by operation of the cam system, as will be described, the blade 72 changes to the contact 76. The motor line 71 is then energized direct from the power line 67, and the amplifier is out of the circuit.

The relay 73 is actuated by the cam-operated normally-open roller-switch 60, and is self-locking. The instant this switch 60 is closed, current from the line 67 flows through the solenoid 77 of the relay. The blade 72 moves to the contact 76 in the motor circuit, as already explained, and the blade 78 closes on the contact 79. Current then flows from the line 67 through the normally-closed cam-operated switch 59, the blade 78, the contact 79, and the solenoid 77. The relay is thus locked closed, and remains so regardless of whether the switch 60 is closed or open. The relay continues locked until the switch 59 is opened momentarily by its cam 56, whereupon the solenoid 77 is deenergized and the entire relay returns to normal position. The purpose of the relay 73 is to provide a search circuit for restoring normal operation in case of a violent change in float position, as will be later described more fully.

Figure 6:
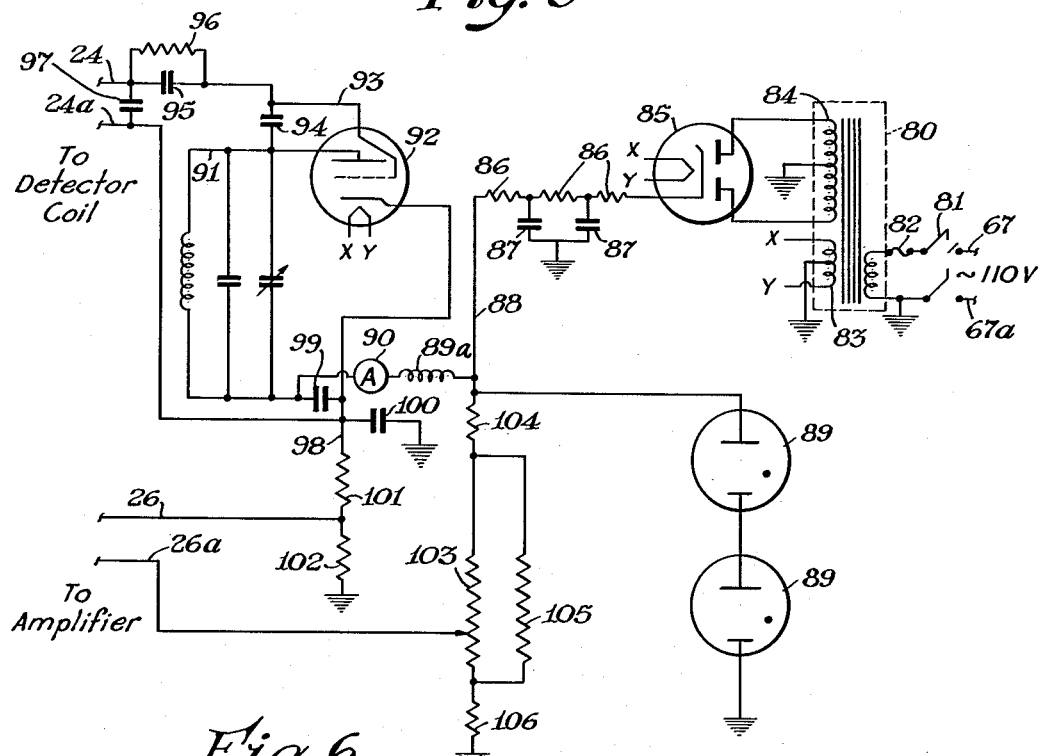
Fig. 6 is a circuit diagram of the oscillator indicated generally in Fig. 5.

The details of the circuit of the oscillator 25 appear in Fig. 6. Power is drawn from a transformer 80, the primary of which is supplied from the line 67 and 67A through a switch 81 and fuse 82. One winding 83 of the secondary supplies filament voltage to the various electron-tubes (through circuits shown schematically as X—Y). The other winding 84 of the secondary supplies a full-wave rectifier tube 85, e. g. a 6X5GT, to produce approximately 300 volts direct current, which passes through a filter circuit comprising resistors 86 and condensers 87 to a line 88. The potential in this line is stabilized at 300 volts by two voltage regulator tubes 89, e. g. two OD3's, in series to ground.

The potential in the line 88 is imposed through an R. F. choke 89a and ammeter 90 to the tuned plate circuit 91 of a triode 92, e. g. a No. 76 tube. The grid circuit 93 of this triode, coupled to the plate by a feedback condenser 94, is connected through a condenser 95 and resistor 96 in parallel to one of the leads 24 to the detector coil 15. A condenser 97 is in parallel with the coil. The other lead 24a from the coil is connected to the cathode or D. C. output circuit 98 of the triode 92. Any A. C. components in the cathode circuit may pass to ground through a condenser 100. The grid circuit, including the coil 15, is preferably tuned to oscillate at about 800 kilocycles.

The D. C. output of the oscillator, i. e. the cathode circuit 98, is connected through a resistor 101 (e. g. 68 kilo-ohms) to the lead 26 going to the amplifier circuit, and is also connected through a load resistance 102 (3 ohms) to ground. The oscillator output thus applied as potential to the lead 26 is opposed by a reference potential derived from a potentiometer 103. The latter obtains its voltage from the stabilized D. C. input line 88 through a resistor 104 (360 kilo-ohms), the potentiometer 103 being paralleled by a low resistance 105 (7.5 ohms) and grounded through another resistor 106 (7.5 ohms).

The potential across the amplifier leads 26 and 26a is applied to the input of the amplifier 27 (Fig. 7). This amplifier itself is an inverter-amplifier of standard type intended for receiving a small D. C. input and producing an A. C. power output proportional to and phased in accordance with the magnitude and polarity of the input. The amplifier receives current from the line 67 and 67A through a power transformer 107. The D. C. input from the leads 26 and 26a is imposed on a converter 108 and input transformer 109. The resulting alternating voltage in the leads 110 and 110a is amplified by three stages of amplification in the double triodes 111 and 111a and thence through a phase discriminator circuit involving the power double triodes 112 and 112a to the motor leads 28.

It will be appreciated that, in the instrument of Figs. 3 to 6, the oscillator 25 is of the tuned-grid tuned-plate type. The proximity of the metal-containing rotameter float 14 to the indicator coil 15 affects the tuning of the grid circuit. In practice, the oscillator is tuned to oscillate with maximum amplitude when the coil 15 is remote from the float (an inch or more away). Thus, when the coil approaches the float, the oscillator becomes partially detuned, and the amplitude of oscillation decreases, becoming a minimum when the coil is precisely opposite and surrounding the float. Consequently, as the coil 15 approaches the float, the D. C. plate current of the triode 92, which is indicated by the ammeter 90, increases sharply. Correspondingly, the potential produced by the flow of the D. C. output of the tube 92 through the load resistor 102 is also at a maximum when the coil 15 is centered on the float 14.

This potential, which is applied to the amplifier lead 26, is opposed by a constant D. C. potential in the lead 26a derived from the potentiometer 103. The latter is adjusted to provide a potential which is greater than the oscillator output potential in lead 26 when the coil is remote from the float but is less when the coil is opposite the float. As a result, the signal to the amplifier, between leads 26 and 26a, is zero when the coil 15 is at a balance point which is slightly removed (varying from one tenth to a few tenths of an inch depending on the float size) from being exactly centered on the float 14. Slight displacements of the float from this balance point cause corresponding signals to the amplifier, the polarity of the signal being dependent on the direction of the displacement. For small-size rotameter tubes, the polarity of the leads 26 and 26a relative to the motor 20 is preferably such that, at the balance point just described, the coil is slightly below the float. In this way, the top of the float can be seen, and rotameter readings taken visually, without obstruction by the body of the coil. On the other had, for large-size tubes using long floats, the opposite polarity of the leads is preferred, so that the coil balances slightly above the float, an arrangement allowing the coil to follow even a very long float all the way down to its zero position without striking the inlet fitting 12.

In the normal operation of the instrument of Figs. 3 to 6, the coil 15 follows the float 14 through whatever changes in elevation it undergoes as a result of changes in the rate of flow of liquid through the rotameter tube 11. Thus, if the float starts to rise, the magnitude of the oscillation in the oscillator 25 changes slightly, and the potential in the oscillator output lead 26 becomes different from the reference potential in the lead 26a, the polarity of the resultant voltage between the two leads being such as to tend to restore balance in the system. The amplifier 27 at once receives an input, and produces an A. C. output in the motor leads 28 which are connected through the contact 74, switch blade 72, and lead 71 to the motor 20. The motor immediately turns, rotating its pinion 55, and driving the drum 52. The latter operates the cable 17, raising the carriage 40 until the coil 15 is again balanced on the float 14, at which time the oscillator output D. C. voltage in the lead 26 once more equals the reference potential in 26a; the amplifier input then falls to zero, and the motor 20 stops. On the other hand, if the float 14 starts to fall, the same sequence occurs, except that the polarity is reversed so that the motor 20 is driven to lower the carriage 40. During all movements of the drum 52 and carriage 40, the sector gear 63 undergoes corresponding movements, which it transmits to the pen 22 for recording on the chart 23. Since the response of the electrical system can be made very rapid, with only a few seconds being required for the motor to move the carriage 40 through its entire traverse, the coil 15 and pen 23 accurately follow and record all normal changes in level of the float 14.

In the case of sudden violent surges of flow in the rotameter tube 11, the response of the instrument, though rapid, may not be fast enough to follow the float 14, and the coil 15 may completely "lose" it. With the float thus remote from the coil, the D. C. potential of lead 26 is at a minimum so that a definite potential exists between leads 26 and 26a feeding the amplifier 27. The amplifier then drives the motor 20 at high speed, moving the carriage 40 rapidly toward one of the supports 46. (In case the coil balance point is set slightly below the float, the carriage will move upward.) If, in its movement, the coil again "finds" the float, balance is restored and operation then proceeds normally.

However, if the coil cannot "find" the float at all, i. e. if the float is not between the coil and that end of the tube toward which it is moving, then the search circuit operated by the cams 56 and 57 and the relay 73 comes into use. Unless the coil encounters the float, the carriage 40 continues to move (e. g. upward) until it reaches the limit of its travel. At this point, the cable drum 52 will have rotated to the point where the cam 57 closes the normally-open roller-switch 60. At once the relay 73 (Fig. 5) is energized and locked. The lead 71 of the motor 20 is then completely disconnected from the amplifier 27 and connected directly to line 67. The motor 20 accordingly reverses its direction of rotation and drives the drum 52 and carriage 40 at full speed in the opposite direction to the limit of travel. At this limit, the drum 52 has rotated to its other extreme, and the cam 56 opens the normally closed roller-switch 59. The relay 73 is again de-energized, and the lead 71 of the motor 20 is returned to connection with the amplifier. The direction of motor rotation is once more reversed, and the carriage 40 again traverses the tube 11 (e. g. upwardly) until the coil 15 "finds" the float 14. In other words, if, having lost the float, the coil is unable to find it by continuing along the tube, the search circuit takes over, quickly returns the coil to the other end of the tube and then restores control to the amplifier, allowing the coil again to search. This search circuit is called into action only under exceptional conditions of upset in the flow of fluid in the rotameter tube 11. Under all ordinary flow conditions, the coil 15 readily follows the float 14, and the relay 73 remains unenergized for hours or even days.

Although the instrument of the invention has been described at length in a preferred embodiment, it will be readily appreciated that variations in the details of construction may be made while utilizing the general principles involved. The coil 15, motor 20, and pen 22 may be coupled together by other linkages than the cable, drum, and gear system shown. If desired, the instrument may be made to produce indications at a remote distance by including a telemetering device, such an interconnected pair of self-synchronous motors in place of the pen linkage illustrated. The carriage 40 may be positioned by driving means other than the electric motor, drum, and cable system. Even the indicator coil 14 may be replaced by some other detector device wholly outside the rotameter tube which can be coupled to a circuit arranged to produce an output signal indicative of the close proximity of the float to the device. Such a signal can then be used to actuate the motor or other means for positioning the carriage holding the detector.

The instrument described can also be considered as a position or level recording device which detects and records the position or elevation of a float or other indicating element. Still other adaptations of the indicating principle disclosed are equally possible within the invention in its broadest sense.

The instrument of the invention, especially in its preferred form, exhibits a number of very real advantages. The rotameter is entirely of standard construction. There are no auxiliary chambers and no mechanical elements within the rotameter tube other than a conventional small float. All moving parts are wholly outside the rotameter tube, are visible, and can be reached for servicing without interrupting use of the rotameter as a visual indicator. Several of the sub-assemblies are standard and are available in most instrument shops. Remote indication and control are easily possible. Further, and perhaps most importantly, the instrument has an extremely wide range of usefulness. It can be employed effectively using small size rotameters to record and control small flows of fluids, even of the order of one or two cubic centimeters per minute, without loss of sensitivity, and yet is effective also with rotameters of the largest sizes.

What is claimed is:

1. In a meter having a metal-containing indicating element confined for movement in a fixed path, a single electrical detector coil encircling the path, a carriage holding the coil and mounted for travel along the path, and a reversible motor for moving the carriage, the improved system for controlling the reversible motor which comprises an electron-tube radio-frequency oscillator having a tuning circuit connected to include the detector coil and arranged to produce one direct-current output potential when the coil is remote from the indicating element and a different output potential when the coil is encircling the element, an opposed source of direct current reference potential smaller than the one oscillator output potential but larger than the other, and an electron-tube power amplifier having as its input the potential difference between the oscillator D. C. output potential and the reference potential and having its output connected to actuate the reversible motor to move the carriage in a direction to cause the two opposed potentials to be equated.

2. In a meter having a metal-containing indicating element confined for movement in a fixed path, a single electrical detector coil encircling the path, a carriage holding the coil and mounted for travel along the path, and a reversible motor for moving the carriage, the improved system for controlling the reversible motor which comprises a tuned-grid tuned-plate electron-tube radio-frequency oscillator having its grid circuit connected to include the detector coil and its output arranged to produce a minimum direct current potential when the coil is remote from the indicating element and a maximum potential when the coil is encircling the element, an opposed source of direct-current adjustable to produce a reference potential smaller than the maximum oscillator output potential but larger than the minimum, and an electron-tube inverter-amplifier having as its input the potential difference between the oscillator D. C. output potential and the reference potential and having its output connected to actuate the reversible motor to move the carriage in a direction to cause the two opposed potentials to be equated.

3. In a meter having an indicating element confined for movement in a fixed path, a detector element, a carriage holding the detector and mounted for movement along the path, means including a reversible motor for positioning the carriage, and a motor-control circuit responsive to the proximity of the detector to the indicating element and arranged to actuate the reversible motor in a direction to bring the detector into close proximity with the indicating element, the combination therewith of an independent source of current for actuating the reversible motor, switching means activated when the carriage reaches its limit of travel in a single predetermined direction to disconnect the reversible motor from the motor-control circuit and connect it to the independent current source to cause the carriage to travel in the opposite direction, and additional switching means activated when the carriage reaches its limit of travel in the opposite direction to deactivate the first switching means.

4. In a meter having an indicating element confined for movement in a fixed path, a detector element, a cable-driven carriage holding the detector and mounted for movement along the path, a drum for moving the cable driving the carriage, a reversible motor for turning the cable drum, and a motor-control circuit responsive to the proximity of the detector to the indicating element and arranged to actuate the reversible motor in a direction to bring the detector into close proximity with the indicating element, the combination therewith of an independent source of current for actuating the reversible motor, first switching means activated when the cable drum reaches its limit of travel in a single predetermined direction to disconnect the reversible motor from the motor-control circuit and connect it to the independent current source to cause the drum to travel in the opposite direction, and second switching means activated when the cable drum reaches its limit of travel in the opposite direction to deactivate the first switching means.

References Cited in the file of this patent

UNITED STATES PATENTS

| Number | Name | Date |
|---|---|---|
| 1,838,084 | Drake | Dec. 29, 1931 |
| 2,354,945 | Cohen et al. | Aug. 1, 1944 |
| 2,357,745 | Kliever | Sept. 5, 1944 |
| 2,437,661 | Coake | Mar. 9, 1948 |
| 2,452,023 | Wild | Oct. 19, 1948 |
| 2,503,091 | Brooke Jr. et al. | Apr. 4, 1950 |
| 2,503,868 | Gaumer et al. | Apr. 11, 1950 |
| 2,534,958 | Deming | Dec. 19, 1950 |
| 2,576,611 | Lang et al. | Nov. 27, 1951 |
| 2,593,339 | Ostermann et al. | Apr. 15, 1952 |